United States Patent
Negishi et al.

(10) Patent No.: US 6,571,278 B1
(45) Date of Patent: May 27, 2003

(54) COMPUTER DATA SHARING SYSTEM AND METHOD FOR MAINTAINING REPLICA CONSISTENCY

(75) Inventors: Yasushi Negishi, Machida (JP); Mohan Ahuja, Pacific Palisades, CA (US); Kazuya Tago, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/425,559

(22) Filed: Oct. 22, 1999

(30) Foreign Application Priority Data

Oct. 22, 1998 (JP) ............................................ 10-301007

(51) Int. Cl.[7] ............................................ G06F 15/167
(52) U.S. Cl. ...................... 709/213; 709/200; 709/205; 709/216; 709/217; 709/242; 709/246; 707/201; 707/203; 711/141
(58) Field of Search ................................ 709/200–201, 709/203–205, 212, 216–219, 242, 245, 248; 707/201–204, 8, 10; 714/5–7; 711/141

(56) References Cited

U.S. PATENT DOCUMENTS

| | | | | |
|---|---|---|---|---|
| 5,434,994 A | * | 7/1995 | Shaheen et al. | 709/223 |
| 5,765,171 A | * | 6/1998 | Gehani et al. | 707/203 |
| 5,787,262 A | * | 7/1998 | Shakib et al. | 709/205 |
| 5,819,020 A | * | 10/1998 | Beeler, Jr. | 707/204 |
| 5,893,116 A | * | 4/1999 | Simmonds et al. | 707/201 |
| 6,049,809 A | * | 4/2000 | Raman et al. | 707/203 |
| 6,052,718 A | * | 4/2000 | Gifford | 709/219 |

FOREIGN PATENT DOCUMENTS

EP         0794646        3/1997    ........... H04L/29/06

OTHER PUBLICATIONS

Title: Implementation of hierarchical F–channels for high–performance distributed computing*, Keith Shafer and Mohan Ahuja, Distributed Computing, © Springer–Verlag 1995.
Title: Implementation of F–channels, Mohan Ahuja, Member, IEEE, IEEE Transactions on Parallel and Distributed Systems, vol. 4, No. 6, Jun. 1993.

* cited by examiner

Primary Examiner—Bharat Barot
(74) Attorney, Agent, or Firm—Bracewell&Patterson, LLP

(57) ABSTRACT

To improve communication efficiency during the updating of a replica, and to reduce the amount of memory required for the updating of a replica. The present invention is a computer for maintaining consistency of replica contents by interchanging data modification with another computer. The computer includes: a replica including shared data; a receiver for receiving, from another computer, a modification request for data included in the replica; and a controller for controlling, regardless of a receiving order of the modification request, for each receipt of the modification request, a timing of update execution for the replica in accordance with the received modification request by using information included in the modification request. The timing of replica updating in accordance with the received modification requests can be determined, regardless of the order in which the modification requests are received, that is, the order of the transmission from other computers. Therefore, communication efficiency can be improved and the amount of required memory can be reduced.

15 Claims, 5 Drawing Sheets

|  |  |  |  |  |  |  |  |  |
|---|---|---|---|---|---|---|---|---|
| BT | 0 | 0 | 0 | 1 | 2 | 2 | 2 | 2 |
| SBT | 0 | 1 | 2 | 0 | 0 | 1 | 2 | 3 |

| | (0,0) | (0,1) | (0,2) | (1,0) | (2,0) | (2,1) | (2,2) |
|---|---|---|---|---|---|---|---|
| MODIFICATION REQUEST | O1 | O2 | B1 | T1 | O3 | O4 | F1 |
| | (1) | (2) | (3) | (4) | (5) | (6) | (7) |

FIG. 3

| | (1) | (2) | (3) | (4) | (5) | (6) | (7) |
|---|---|---|---|---|---|---|---|
| | (0,0) | (0,2) | (0,1) | (1,0) | (2,1) | (2,2) | (2,0) |
| RECEPTION ORDER | O1 | B1 | O2 | T1 | O4 | F1 | O3 |
| BT IN PROCESS | 0 | 0 | 0  0 | 1 | 2 | 2 | 2  2  2 |
| SBT IN PROCESS | 0 | 1 | 1  2 | 0 | 0 | 0 | 0  1  2 |
| MODIFICATION EXECUTION | ○ | ○ | ○ — | ○ | ○ | ⋯× | ○ — — |
| DELETION | ○ | × | ○ — | ○ | × | ×⋯ | ○ — — |

FIG. 4

COMPUTER DATA SHARING SYSTEM AND METHOD FOR MAINTAINING REPLICA CONSISTENCY

BACKGROUND OF THE INVENTION

The present invention relates to a system wherein computers have replicas of shared data and maintain replica content consistency by interchanging data modifications, more particularly to the order control of the replica updating. A conventional data sharing system uses the following method to determine the order of the updating of a replica.

In many cases, a data sharing system, in which it is assumed that computers are constantly connected by communication lines, includes a mechanism for issuing a notification each time data are updated. In this case, it is ensured that each time data are modified the order of replica updating will correspond to the sequential order of the data modifications. Such a sequential process is hereinafter referred to as the FIFO order. However, there are cases where portable terminals at remote, outside of the office, are used to read out, browse and/or edit data in computers installed in offices; and as the communication quality provided by the wireless public networks that are used for such portable terminals is lower than is that provided by normal LANs (Local Area Networks), there are frequent packet transmission failures. Then, generally, as the restrictions imposed on the data transferring order become stricter, this is accompanied by a corresponding increase in the costs for a transfer. The FIFO order transmission with the strictest restrictions takes the large overhead. Since using a wireless public network is in itself expensive, this transfer overhead constitutes a serious problem.

In a data sharing system, such as Lotus Notes (a trademark of Lotus Development Corp.), for which it is assumed that operations are also performed during the disconnection of the communication lines, a one-time processing, similar to a batch processing, is used, to update the replica. With this system, data can not be accessed during updating. In addition, when the updating of the replica is interrupted by the disconnection of the communication line, the order in which the updating process was performed is generally indefinite. That is, it is unknown to which data has been updated. EP0794646 (Japanese Published Unexamined Patent Application No. Hei 9-24642) discloses a data management system for managing copies of shared data file, which are maintained in a plurality of computer systems connectable via a mobile communication network. The data management system comprises: logging means for storing records of modifications that are correlated with each copy of the shared data file and that are executed for these copies; extraction means for extracting, via a connection to the mobile communication network, the records stored for the other copies of the shared data file; merging means for merging the extracted records to generate the order of the modifications; conflict resolving means for resolving conflicts in the order of the modification by applying a rule defined in advance to the modification order; and means for modifying the copies of the shared file in accordance with the modification order in which conflicts are resolved. In this case, it is considered that the conflict means there are a plurality of data modifications which are performed in parallel for data in the same shared file edition. In addition, it is considered that the resolution of the conflict means that a plurality of data modifications in conflict are rearranged in a specific order. The data management system is provided to merely resolve the modification conflicts. In order to resolve the conflict, data concerning all the modifications must be prepared by the time a determination as to whether a conflict has occurred. That is, a copy of the shared data file can not be modified unless the modification conflict has been resolved. Therefore, if even one set of data concerning a modification is missing, the modification process can not be performed. In addition, the load imposed on the memory capacity is increased to store the modification related data that is received. This constitutes an immense problem for a portable terminal that has only a small memory capacity available for communication. Further, another problem arises if data must be re-transmitted because of a memory capacity shortage.

As described above, conventionally, during the updating of a replica problems arise concerning communication efficiency, the amount of required memory, and the process when the disconnection of a communication line happens during the data transmission.

It is, therefore, one object of the present invention to provide a method and an apparatus for improving communication efficiency during the updating of a replica.

SUMMARY OF THE INVENTION

To achieve the above objects, the present invention is a computer for maintaining consistency of replica contents by interchanging data modification with another computer. The computer includes: a replica including shared data; a receiver for receiving, from another computer, a modification request for data included in the replica; and a controller for controlling, regardless of a receiving order of the modification request, for each receipt of the modification request, a timing of update execution for the replica in accordance with the received modification request by using information included in the modification request. The timing of replica updating in accordance with the received modification requests can be determined, regardless of the order in which the modification requests are received, that is, the order of the transmission from other computers. Therefore, communication efficiency can be improved and the amount of required memory can be reduced.

The information included in the modification requests includes: a designation indicating no restriction for a modification order (Ordinary in the preferred embodiment);

a first designation indicating that after all modification requests preceding a current modification request have been effected for the replica, the replica is to be updated in accordance with the current modification request (Forward Flush in the embodiment); a second designation indicating that modification requests following a current modification request are to be effected for the replica after the replica has been updated in accordance with the current modification request (Backward Flush in the embodiment); or a third designation indicating that after all the modification requests preceding a current modification request have been effected for the replica, the replica is to be updated in accordance with the current modification request, and that all modification requests following the current modification request are to be effected for the replica after the replica has been updated in accordance with the current modification request (Two Way Flush). In this manner, the order of replica updating can be explicitly designated.

The information included in the modification request may further include: the number (a first number: BT value in the preferred embodiment) of modification requests that have been generated and that include the second or third designation; and the number (a second number: SBT value in the preferred embodiment) of modification requests that have been generated following the last modification request including the second or third designation. Then, a mechanism can be provided that, even if a communication line has been disconnected before the completion of the updating, can confirm to which modification requests have been received and used to update the replica.

The controller may store first and second management values (the values of BT and SBT in a process in the preferred embodiment) that respectively correspond to the first and second numbers and that define a timing of update execution for the replica. Therefore, the timing of the replica updating can be determined more easily.

If the replica is updated in accordance with the modification request, the controller may store, as third and fourth numbers (the values of response BT and SBT), the first and second numbers included in the modification request. The computer may further comprise a transmitter for transmitting to another computer a modification request for data in the replica and the controller may make the third and fourth numbers to be included in the modification request. As a result, even if a communication line is disconnected, the transmission source can determine which modification request is to be re-transmitted, and also which modification request is to be discarded.

The configuration of a computer on the receiving side has been explained. A computer on the transmission side includes: a replica including shared data; means for instructing modification of data included in the replica, and for designating information concerning a modification order to the modification of data; means for generating a modification request which corresponds to an instruction of the modification of data and which includes information concerning the modification order; and a transmitter for transmitting the modification request in such a manner that it is not confirmed that a generation order and a transmitting order of the modification request are identical. As described above, information concerning the modification order is clearly designated for each data modification, and is included in a modification request so that the receiving side can use that information. In addition, in order to improve communication efficiency, this information is transmitted in a manner that it is not confirmed that the generation order and the transmitting order of the modification request are identical. This manner includes a case where a communication line is disconnected and the re-connection of the line and the re-transmission of information are performed.

The modification request can include the same information as included in the previously described modification request.

The computer further may comprise a receiver for receiving from another computer a modification request for data included in the replica and the received modification request may include response information (the values of response BT and response SBT in the preferred embodiment) indicating that the replica has been updated by a destination computer in accordance with the transmitted modification request. Thus, a modification request is ensured that does not need to be re-transmitted. That is, the computer further comprises means for referring to the response information to determine whether the modification request that has been transmitted is to be deleted.

A single computer can include the elements of both the transmission side and the receiving side, and such computers may be used to constitute a data sharing system.

The configuration of a computer has been explained, and the processing to be performed by the computer can be provided as a program. This program can be stored on a floppy disk or a CD-ROM, or in another storage device.

BRIEF DESCRIPTION OF THE DRAWINGS

FIG. 3 is a diagram illustrating the assignment of the values of the BT and the SBT to the modification request.

FIG. 4 is a diagram for explaining the execution and deletion of a modification request.

DESCRIPTION OF THE PREFERRED EMBODIMENTS

Figure 1:
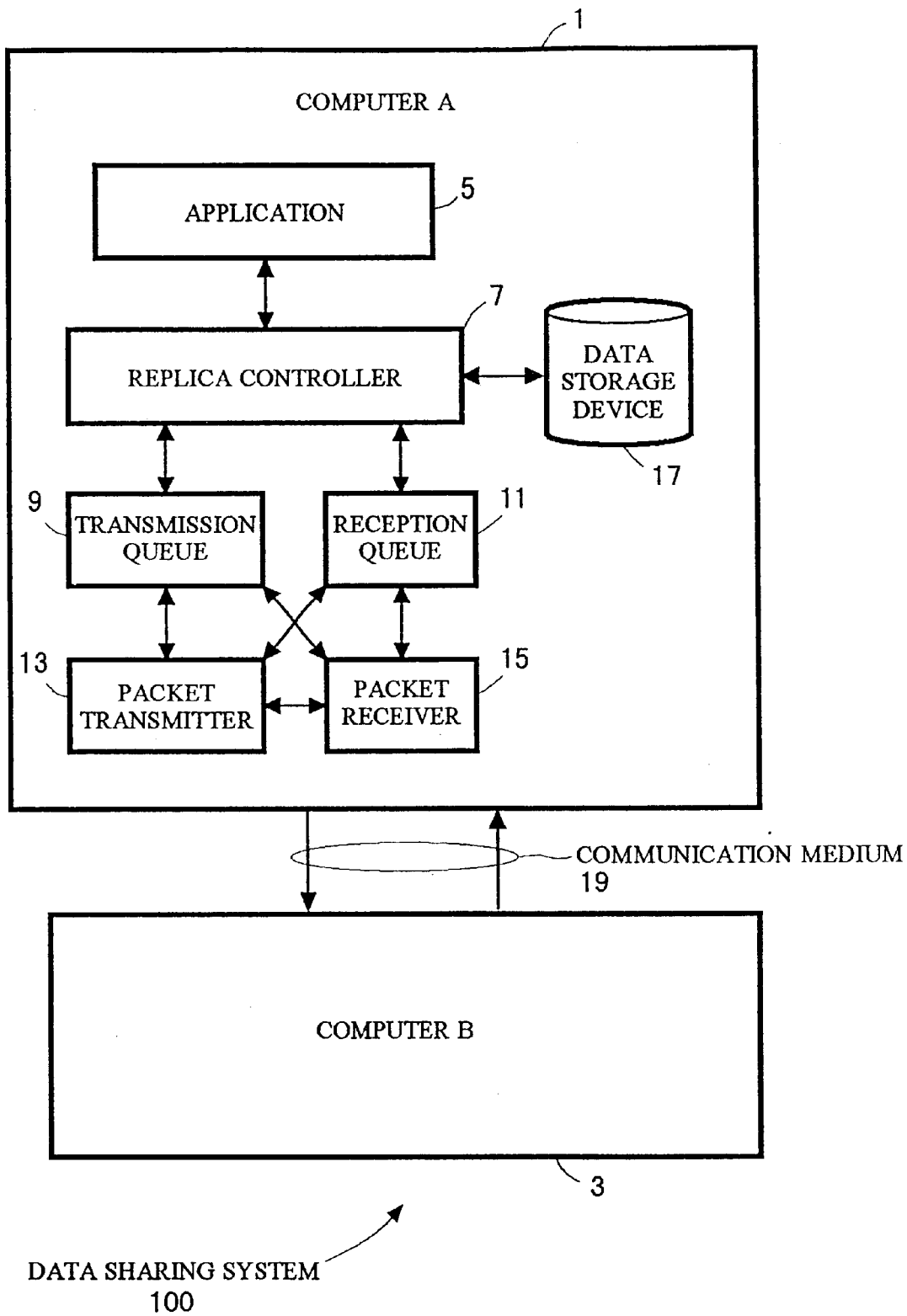
FIG. 1 is a diagram illustrating a data sharing system according to the present invention.

FIG. 1 is a diagram illustrating the configuration of a data sharing system according to the present invention. The data sharing system 100 comprises a computer A(1) and a computer B(3). While the number of computers is not limited to two, to make the explanation given for this embodiment easier to understand only two computers are used. In this invention, the same components are provided for both the computer A(1) and the computer B(3), but in FIG. 1 only the components for the computer A(1) are shown. Each of the computers A(1) and B(3) includes one or more applications 5, a replica controller 7, a transmission queue 9, a reception queue 11, a packet transmitter 13, a packet receiver 15, and a data storage device 17.

An application 5 issues a request to the replica controller 7 for the generation, the searching, the referencing and the deletion of data and etc. When issuing a data modification request, such as the generation or the deletion of data, the order of the replica in the replica updating is designated. According to the present invention, the designations used for the order of replica updating are Ordinary, Forward Flush, Backward Flush and Two Way Flush. Since the access to data, other than the modification, is performed the same as in a normal database access, no detailed explanation for it will be given.

The Ordinary designation is used to indicate that no restriction is placed on the order of a corresponding replica updating when the modification is performed. The Forward Flush designation is used to indicate that the replica updating corresponding to the modification of the data in the replica will be performed after all preceding modifications have been effected for the replica. The Backward Flush designation is used to indicate that after the current data modification has been effected for the replica, succeeding modifications of data are to be effected for the replica. The Two Way Flush designation is used to indicate that the restrictions provided for both the Forward Flush and the Backward Flush designations apply. The four designations given above are described as to the order of transmission/reception message, for example, in "An Implementation of F-channels," Mohan Ahuja, IEEE Transactions on Parallel and Distributed Systems, Vol. 4, No. 6, June 1993. However, the application of the designations for a data sharing system is neither described nor taught in the referenced paper. Further, the portions related to a transmission queue and a reception queue, which will be described later, are also neither described nor taught in the paper.

Upon receiving an access request from the application 5, the replica controller 7 accesses to data stored in the data storage device 17, and adds a packet transmission request to the transmission queue 9. In addition, the replica controller 7 examines the state of the reception queue 11, and in accordance with a designated timing, updates the replica so as to correspond to the modification request stored in the reception queue 11. The replica controller 7 can be divided into a section for accessing to the data storage device 17 and a section for designating the contents to be accessed. According to the present invention, a conflict caused by the applications 5, and a conflict that occurs between a modification of data by an application 5 and a data modification request stored in the reception queue 11 are not handled, and the modification of data by the application 5 and the execution of the data modification request stored in the reception queue 11 are performed independently. If a conflict occurs, it may be resolved by using a conventional method, or either of the executions may be ignored.

The data storage device 17 is used to store a replica, and has the same functions as an ordinary database. That is, in accordance with a request received from the replica controller 7, data are generated, searched for, referred to, or deleted.

The transmission queue 9 is used to manage a packet transmission request. The packet transmission request includes the type and the contents of the data modification prepared by the application 5, the designation of the updating order, and the value of BT and the value of SBT when a transmission request is generated. The value of BT and the value of SBT are included in the transmission queue 9 as data for the management of the queue. The BT value is used to represent the number of data modifications (also called data modification requests) that have been received from the application 5 and for which either the Backward Flush or the Two Way Flush has been designated as the updating order. The BT value is managed by the replica controller 7. The SBT value is used to represent the number of data modifications generated from the time either the last Backward Flush or the last Two Way Flush was designated until the latest modification was generated. The value of SBT is also managed by the replica controller 7.

Other information given includes the value of response confirmation BT for managing the BT value for the latest modification request that is received by the computer B(3) and whose execution is performed for the replica; and the value of response confirmation SBT for managing the SBT for the latest modification request that is also received by the computer B(3) and whose execution is performed for the replica. These data are managed by the packet receiver 15.

The reception queue 11 is used to manage the modification requests in packets with which updating has not yet been effected, even though the packets have been received. In addition to the modification requests, there are the value of BT in process, which represents the value of the modification request BT that can currently be executed; the value of SBT in process, which represents the value of the modification request SBT that can be currently executed; the value of response BT, which represents the value of BT included in the latest modification request processed by the replica controller 7; and the value of response SBT, which represents the value of SBT included in the latest modification request processed by the replica controller 7. These numbers are managed by the replica controller 7.

The packet transmitter 13 monitors the transmission queue 9 and the reception queue 11, generates a necessary packet, and transmits it to a communication medium 19. The packet transmitter 13 sequentially transmits the transmission requests, stored in the transmission queue 9, in such a manner that it is not confirmed that the computer B(3) will receive the requests in the order in which they were stored in the transmission queue 9 (the generation order). Specifically, transmission is not performed in such a manner that a packet is transmitted after it has been confirmed that the preceding packet has been received in the generation order, but packets are sequentially transmitted. When the transmission destination computer B(3) fails to receive a packet, the pertinent packet is re-transmitted. The same packet may be repeatedly transmitted until it is confirmed that the packet has been received and the updating process has been performed. At this time, the value of response confirmation BT and the value of response confirmation SBT can be used. The transmitting order may not be at all related to the generation order of the transmission requests.

The packet transmitter 13 selects one of the packet transmission requests in the transmission queue 9, and prepares and transmits a packet which includes the value of response BT and the value of response SBT in the reception queue 11. The value of response BT and the value of response SBT are used to change the values of the response confirmation BT and SBT that are stored in the transmission queue 9 of the computer B(3). If no transmission requests are stored in the transmission queue 9, only the values of the response BT and SBT are transmitted.

The packet receiver 15 examines the contents of a received packet and the states of the transmission queue 9 and of the reception queue 11, and updates these queues. That is, the packet receiver 15 uses the value of response BT and the value of response SBT in a received packet to update the values of the response confirmation BT and SBT stored in the transmission queue 9. If the response BT>the response confirmation BT, the values of the response confirmation BT and SBT are updated by using the values of the response BT and SBT. If the response BT=the response confirmation BT, it is checked whether the response SBT>the response confirmation SBT. If this condition is established, the value of the response confirmation SBT is updated by using the value of the response SBT. If the above condition is not established, the values of the response confirmation BT and SBT are not updated.

The modification requests in the received packets may be duplicated. Therefore, the packet receiver 15 examines the value of BT and the value of SBT included in a modification request in a received packet. Then, if a modification request stored in the reception queue 9 has the same value of BT and the same value of SBT, the modification request in the packet received later is discarded.

Also, the modification request included in a received packet may be a request that has already been processed. Thus, the packet receiver 15 will discard, by referring to the reception queue 11, a modification request for which the value of included BT is smaller than that of the response BT, and a modification request for which the value of included BT is the same as that of the response BT and the value of included SBT is smaller than that of the response SBT.

A transmission request for which it is established that the response confirmation BT≧the included BT, or that the response confirmation BT=the included BT and the response confirmation SBT≧the included SBT, can be deleted from the transmission queue 9. The transmission request may be deleted by either the packet receiver 15 or the transmitter 13.

The BT and the SBT included in a modification request concerning a received packet are examined, and the modification requests stored in the reception queue 11 are rearranged in the ascending order of the BT and the SBT. This process may also be performed by either the packet receiver 15 or the replica controller 7.

The communication medium 19 may be either wireless or cable, or may be a combination of the two. The feature of the present invention lies in its ability to cope with problems that arise when data is transmitted via a less reliable communication network.

Figure 2:
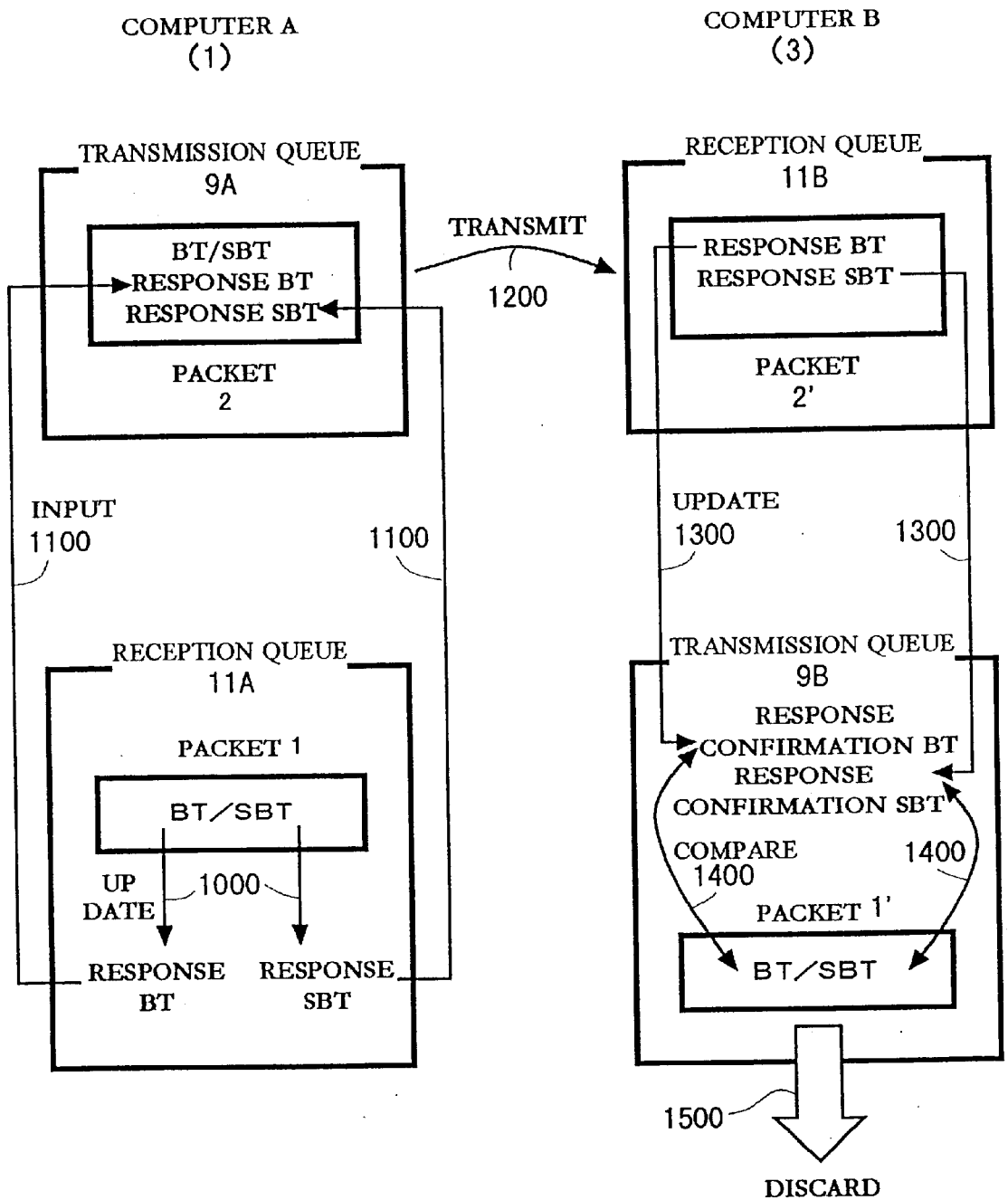
FIG. 2 is a flowchart showing the relationship between the values of the BT and the SBT included in a modification request, the values of the response BT and the response SBT, and the values of the response confirmation BT and the response confirmation SBT.

Referring to FIG. 2, an explanation will be given for the relationship and the updating of the values of the BT, the SBT, the response BT, the response SBT, the response confirmation BT, and the response confirmation SBT.

FIG. 2 shows the processing performed after the replica controller 7 executes a modification request related to a packet 1 stored in a reception queue 11A of a computer A(1). Here, "A" is used to identify the components of the computer A, and similarly, "B" is used to identify the components of the computer B. When the modification request is executed, the replica controller 7 uses the values of the BT and the SBT included in the packet 1 to update the values of the response BT and the response SBT in the reception queue 11A (step 1000). The updated values of the response BT and SBT are taken into a packet 2 that is prepared in a transmission queue 9A for transmission to the computer B (3) (step 1100). When the packet transmitter 13A transmits the packet 2 (step 1200), the packet receiver 15B of the computer B(3) receives it and stores it in the reception queue 11B as packet 2'. As described above, the packet receiver 15B uses the values of the response BT and the response SBT related to the modification request in the packet 2' to determine whether the values of the response confirmation BT and SBT in the transmission queue 9B should be updated. Since in FIG. 2 it is assumed that one of the above conditions has been established, the values of the response confirmation BT and SBT are updated (step 1300). Then, the value of response confirmation BT is compared with the value of BT included with the modification request in the transmission queue 9B, and the value of response confirmation SBT is compared with the value of SBT included with the modification request in the transmission queue 9B (step 1400). Two matches are obtained and the packet 1' is then discarded (step 1500). When the packet 1' in the transmission queue 9B is discarded, it is not again transmitted to the computer A(1).

Referring to FIGS. 3 to 6, an explanation will now be given for the processing performed by the replica controller 7 when executing a modification request in the reception queue 11. First, the assignment of the value of BT and the value of SBT will be described referring to FIG. 3. In FIG. 3, O is assigned when Ordinary is designated the updating order in the modification request; B is assigned when Backward Flush is designated; T is assigned when Two Way Flush is designated; and F is assigned when Forward Flush is designated. A subscript is used to describe the appearance order for each designation. First, both value of the BT and the SBT are initialized to 0. Then, when at (1) Ordinary is designated by the application 5, (0, 0) is assigned for data modification $O_1$. It should be noted (BT, SBT). Then, the value of SBT is incremented by one. When at (2) the Ordinary is again designated, (0, 1) is assigned for data modification $O_2$. Then, the value of the SBT is again incremented by one. Therefore, when at (3) Backward Flush is designated, (0, 2) is assigned for data modification $B_1$, and then the value of the SBT is cleared and the value of the BT is incremented by one.

When at (4) Two Way Flush is designated, (1, 0) is assigned for data modification $T_1$. In this case also, the value of the SBT is cleared and the value of the BT is incremented by one. When at (5) Ordinary is designated, (2, 0) is assigned for data modification $O_3$, and then the value of the SBT is incremented by one. When at (6) Ordinary is also designated, (2, 1) is assigned for data modification $O_4$, and the value of the SBT is incremented by one. When at (7) Forward Flush is designated, (2, 2) is assigned for data modification $F_1$, and the value of the SBT is incremented by one as defined.

An explanation will now be given, referring to FIG. 4, for the processing performed if a packet including the data modification request shown in FIG. 3 is transmitted by the packet transmitter 13 to the computer B(3). The packet receiver 15B has received packets in the order $O_1$, $B_1$, $O_2$, $T_1$, $O_4$, $F_1$ and $O_3$, as shown in FIG. 4. It should be noted that in the example in FIG. 4 the data modification requests are received and processed one by one. If a plurality of data modification requests are stored in the reception queue 11B, they are rearranged in the ascending order of the BT value and of the SBT value, as described above. Instead of the sequential procedure depicted by the example in FIG. 4, several packets may be received at one time.

First, the value of BT and the value of SBT in process are initialized to 0. At (1) the packet receiver 15B receives data modification $O_1$ and adds it to the reception queue 11B. The state of the reception queue 11B is shown at the left in FIG. 5(1). The replica controller 7B uses the values of the BT and the SBT in process and the values of the BT and the SBT included in the data modification $O_1$ to determine whether the data modification $O_1$ can be executed. The determination reference is as follows:

(a) a case where Ordinary or Backward Flush is designated as the updating order of data modification requests The pertinent data modification can be executed if:

the value of BT included in the data modification request≦the value of BT in process.

(b) a case where Forward Flush or Two Way Flush is designated as the updating order of data modification requests The pertinent data modification can be executed if:

the value of BT included in the data modification request= the value of BT in process; and the value of SBT included in the data modification request=the value of SBT in process.

At (1) in FIG. 4, Ordinary is designated, and both the value of BT in the data modification request and the value of BT in process are 0. In accordance with the above determination reference, the modification request can be executed. Therefore, the replica controller 7B executes the data modification $O_1$. At (1) in FIG. 4, "o" is entered in the "modification execution" row.

Then, it is checked whether the data modification $O_1$ can be deleted from the reception queue 11B. This determination is performed by whether the value of BT included in the data modification request=the value of BT in process and the value of SBT included in the data modification request=the value of SBT in process. If the above condition is established, the values of BT and SBT in process are also updated. The updating method is performed as follows:

(a) a case where Ordinary or Forward Flush is designated as the updating order of data modification requests the value of SBT in process=the value of SBT in process+1.

(b) a case where Backward Flush or Two Way Flush is designated as the updating order of data modification requests the value of BT in process=the value of BT in process+1; and the value of SBT in process=0.

Since the above determination reference is satisfied, the replica controller 7B can delete the data modification $O_1$ from the reception queue 11B. Therefore, in FIG. 4 "o" is entered in the "deletion" row. Since Ordinary is designated for the data modification $O_1$, the value of SBT in process is incremented by one, as in the above updating method. Thus, no data modification request is present in the reception queue 11B, as indicated by an arrow at (1) in Figure.

Following this, at (2) the packet receiver 15B receives data modification $B_1$. Since Backward Flush is designated, the value of BT included in the data modification $B_1$ is compared with the value of BT in process to determine whether the determination reference is satisfied. Thus, the replica controller 7B executes the data modification $B_1$. "o" is entered in the "modification execution" row at (2) in FIG. 4. However, since the value of SBT in the data modification $B_1$ differs from the value of SBT in process, the data modification $B_1$ can not be deleted from the reception queue 11B. As shown at (2) in FIG. 5, the data modification $B_1$ received by the packet receiver 15B remains in the reception queue 11B. However, the whole data modification $B_1$ need not remain in the reception queue 11B. Since the data modification request has been performed, the data directly concerning the data modification can be deleted, and the only other basic data in the data modification request, such as the values of BT and SBT and the designation of the updating order, must be maintained. In such cases, broken line enclosed blocks are used in FIG. 5. Therefore, $B_1$ is entered in a broken line enclosed block.

At (3) the packet receiver 15B receives data modification $O_2$. The value of BT included in the data modification $O_2$ is 0 and the value of SBT is 1. Since the value of SBT is smaller than that in the data modification $B_1$, as shown at (3) in FIG. 5 the packet receiver 15B updates the reception queue 11B, so that the data modification $O_2$ is placed first and the data modification $B_1$ is placed second. Since both the value of BT in the data modification $O_2$ and the value of BT in process are "0," the replica controller 7B determines that the data modification $O_2$ can be executed, and executes it. "o" is entered in the "modification execution" row at (3) in FIG. 4. Further, since the value of BT in the data modification $O_2$ matches the value of BT in process and the value of SBT in the data modification $O_2$ matches the value of SBT in process, the replica controller 7B deletes the data modification $O_2$. "o" is entered in the "deletion" row at (3) in FIG. 4.

Figure 5:
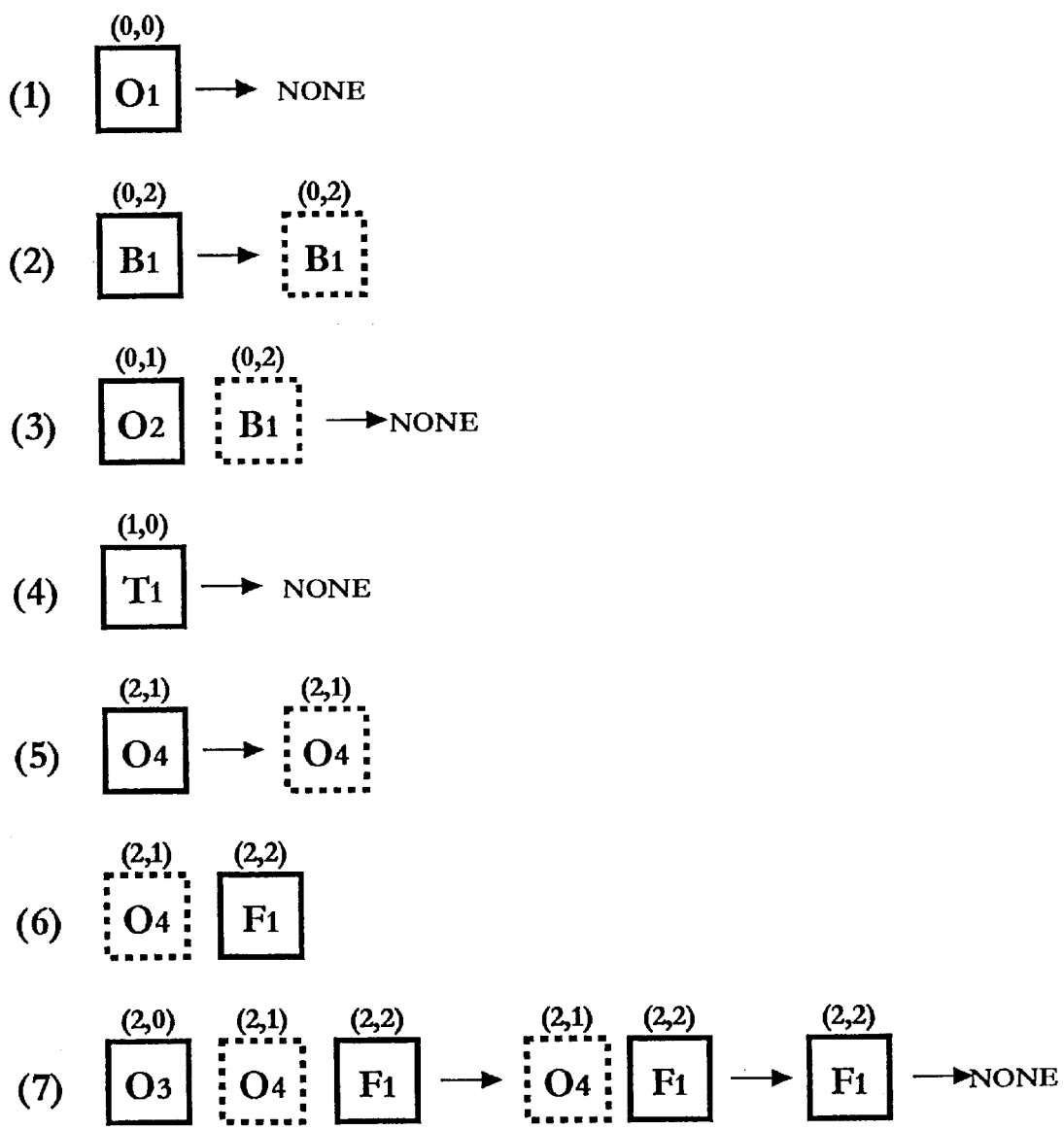
FIG. 5 is a diagram showing the state of a reception queue in FIG. 4.
Figure 6:
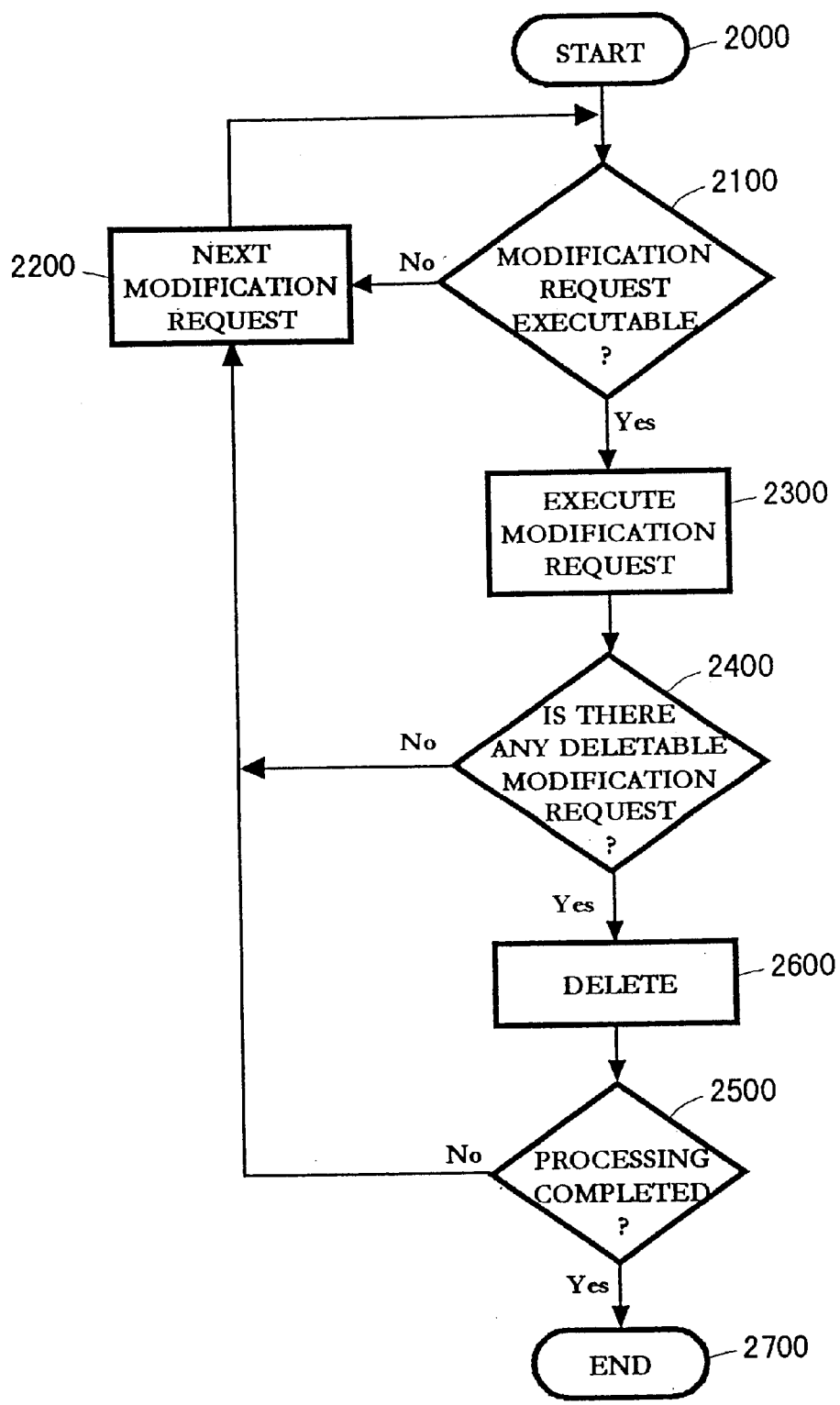
FIG. 6 is a flowchart showing the processing of the execution and the deletion of a modification request.

Since Ordinary is designated as the updating order and since the two values of the BT and the BT in process match and the two values of the SBT and the SBT in process also match, the value of SBT in process is incremented by one. In this case, the value of the BT in process is 0 and the value of the SBT in process is 2. Therefore, the values of the BT and the SBT included in the data modification $B_1$ that is maintained in the reception queue 11B match the values of the BT in process and the SBT in process. The replica controller 7B then deletes the data modification $B_1$ in the reception queue 11B. The deletion of the data modification $B_1$ is indicated by an arrow pointing from (3) to (2) in FIG. 4. Further, the right side at (3) in FIG. 5 shows that the reception queue 11B is empty. Furthermore, since Backward Flush is designated as the updating order included in the deleted data modification, and since the values of the BT and the SBT in that data modification respectively match the values of the BT in process and the SBT in process, the replica controller 7B increments the value of the BT in process by one, and clears the value of the SBT in process.

At (4) the packet receiver 15B receives a data modification $T_1$. Since the value of the BT included in the data modification $T_1$ matches the value of the BT in process, and since the value of the SBT in the data modification $T_1$ matches the value of the SBT in process, the replica controller 7B executes the data modification $T_1$. "o" is entered in the "modification execution" row at (4) in FIG. 4. Further, since the data modification $T_1$ can be deleted, the replica controller 7B deletes it from the reception queue 11B. "o" is entered in the "deletion" row at (4) in FIG. 4. Also at (4) in FIG. 5, a data modification $T_1$ is temporarily stored in the reception queue 11B and is then deleted, and the reception queue 11B becomes empty. Since Two Way Flush is designated for the data modification $T_1$, the value of the BT in process is incremented by one, and the value of the SBT in process is cleared.

At (5), the packet receiver 15B receives a data modification $O_4$. Since Ordinary is designated as the updating order and both the value of the BT in the data modification $O_4$ and the value of the BT in process are 2, the replica controller 7B executes the data modification $O_4$. "o" is entered in the "modification execution" row at (5) in FIG. 4. However, since the value of the SBT in process does not match the value of the SBT included in the data modification $O_4$, the data modification $O_4$ can not be deleted from the reception queue 11B. It is shown at (5) in FIG. 5 that, after the execution of the data modification $O_4$, the data modification $O_4$ placed in a broken line enclosed block and is maintained in the reception queue 11B.

At (6) the packet receiver 15B receives data modification $F_1$. The packet receiver 15B examines the values of the BT and the SBT included in the data modification $F_1$ in order to add the data modification $F_1$ after the data modification $O_4$ in the reception queue 11B. The replica controller 7B determines whether the data modification $F_1$ can be executed. Since the value of the SBT in the data modification $F_1$ does not match the value of the SBT in process, the data modification $F_1$ can not be executed, and accordingly, can not be deleted from the reception queue 11B. (6) in FIG. 5 shows the state where two data modification requests are maintained in the reception queue 11B.

At (7) the packet receiver 15B receives a data modification $O_3$. The packet receiver 15B examines the values of the BT and the SBT included in the data modification $O_3$ and rearranges the order in the reception queue 11B. As shown at (7) in FIG. 5, the data modification $O_3$ is placed first, the data modification $O_4$ is placed second, and the data modification $F_1$ is placed third (see the leftmost at (7) in FIG. 5). Since the value of the BT in the data modification $O_3$ matches the value of the BT in process, the replica controller 7B executes the data modification $O_3$. "o" is entered in the "modification execution" row at (7) in FIG. 4. In addition, since the value of the SBT in the data modification $O_3$ matches the value of the SBT in process, the replica controller 7B deletes the data modification $O_3$ (see the second block from the left at (7) in FIG. 5). "o" is entered in the "deletion" row at (7) in FIG. 4. Since Ordinary is designated as the updating order in the data modification $O_3$, and since the values of the BT and the SBT in the data modification $O_3$ match respectively the values of the BT in process and the SBT in process, the replica controller 7B increments by one the value of the SBT in process. Then, the resultant values of the BT in process and the SBT in process match the values of the BT and the SBT in the data modification $O_4$ stored in the reception queue 11B. Therefore, the replica controller 7B deletes the data modification $O_4$ from the reception queue 11B (see the third block from the left at (7) in FIG. 5). An arrow extending from (7) to (5) in FIG. 4 indicates that the deletion can be performed.

Furthermore, since the values of the BT and the SBT in the data modification $O_4$ match respectively the values of the BT in process and the SBT in process, and since Ordinary is designated for the updating order in the data modification $O_3$, the replica controller 7B increments by one the value of the SBT in process. As a result, the values of the BT and the SBT included in the data modification $F_1$ that could not be executed at (6) match the values of the BT in process and the SBT in process, respectively. The replica controller 7B executes the data modification $F_1$, and deletes it from the reception queue 11B. The rightmost state at (7) in FIG. 5 indicates that the reception queue 11B has finally been empty. A broken line extending from (7) to (6) in FIG. 4 indicates that both the execution and the deletion of data modification are possible.

The overall processing described above is shown in FIG. 6. First, if a modification request is received and added to the reception queue 11 or if an instruction is received from step 2200, it is checked whether the modification request designated at step 2000 can be executed (step 2100). This determination is made by the designation of the updating order and the values of the BT and the SBT, all of which are included in the modification request. If the modification request can not be executed, processing of the succeeding modification request stored in the reception queue 11 is begun (step 2200). When there is no succeeding modification request in the reception queue 11, program control waits for the reception of a modification request. Although not shown in FIG. 6, each time a modification request is entered in the reception queue 11, the packets in the queue 11 are rearranged in the ascending order of the values of the BT and the SBT. If the modification request is executable, it is executed (step 2300). It is checked whether there is a modification request that can be deleted from the reception queue 11 (step 2400). If such a modification request is present, it is deleted (step 2600). At step 2600 the replica controller 7 also uses the values of the BT and the SBT in the deleted modification request to update the values of the response BT and the response SBT in the reception queue 11. When the modification request is deleted, the values of the BT and the SBT in process are changed as needed. When there is no modification request that can be deleted, program control returns to step 2200. After the modification request is deleted, it is checked whether the processing has been competed. If the processing has not yet been completed, program control returns to step 2200. When it is ascertained that the processing has been completed, at step 2700 the processing is terminated.

As described above, the packet receiver 15 updates the order of the modification requests in the reception queue 11 each time such a request is received, and decides the timing/order of the execution of the individual modification requests by determining whether the modification requests can be executed. This operation is not at all related to the reception order. Even if the modification requests are not received in the generation order of the requests, an executable modification request can be identified and executed, so that the processing efficiency is improved. In addition, since some modification requests can be deleted after being executed, the efficiency of the use of the memory can be improved. Even if the executed modification request can not be deleted, only the basic information for the request need be maintained, and the efficiency in the use of memory is improved even more.

Only two computers are provided for the data sharing system in FIG. 1, but three or more computers may be provided. It should be noted that to implement the present invention the above described configuration is required for each computer pair.

The above described embodiment can be variously modified, and the components need not be equipped on the same computer. The functions of the packet receiver 15 and the replica controller 7 can be assigned to either of the components, as needed, and the components may be integrally formed. Similarly, the data storage device 17 and the replica controller 7 may be integrally formed. In the above embodiment, the execution and the deletion of a modification request are independently performed, but these may be performed at the same time. At this time, the values of the BT and the SBT have to be stored separately in order to update the values of the response BT and the response SBT. In addition, instead of managing the values of the response confirmation BT and the response confirmation SBT, each time the values of the response BT and the response SBT are received, a modification request that includes the equivalent values of the BT and the SBT may be deleted. The transmission queue and the reception queue may be stored in the main memory or in a dedicated memory. The modification request that has been executed may not be held in the reception queue, and another queue or table may be used to update the values of the BT and the SBT in process. Further, instead of managing the value of the SBT in process, modification requests in the reception queue including the same value of BT may be counted as needed.

The invention provides the following advantages:
1) A method and an apparatus for improving communication efficiency during the updating of a replica can be provided.
2) A method and an apparatus for reducing the amount of memory required for the updating of a replica can be provided.
3) A method and an apparatus for determining to which replica updating by a modification request is performed, even if a communication line is disconnected before updating the replica is completed can be provided.
4) The order in which a replica can be updated is clearly designated.

For example, a plurality of sheets of large image data are replicated, and the image data is divided into a plurality of segments to transmit the image data. In this case, the transmission order of the image data segments need not be controlled. However, it is preferable that, even if the communication line is disconnected intentionally or by accident during the replicating, image data is obtained for which as many data segments as possible are replicated. If the conventional FIFO order is used to replicate the image data, it can be confirmed that the image data have been replicated so long as data at the end of each image data segment was replicated. However, in this case the transmission overhead is large. In addition, even if the image data are replicated in a batch processing, once a line is disconnected, it can not be ensured that all the data in each image data segment have been replicated. According to the present invention, if Forward Flush is designated at the end of one image data set, the transmission order is not restricted as to the data transmission in one image data, and the data transmission order for images can be controlled. If the end data is updated, it is ensured that overall the image data have been replicated.

An explanation will be given for an example where personal information owned by a salesperson and his or her monthly sales chart are to be replicated. Assume that the personal information includes the employee's number and name, department and section, and telephone number, and that the monthly sales chart includes the employee's number and daily sales. A sales record output program obtains the employee's number from the monthly sales chart in order to search for the personal information, and outputs the corresponding name, department and section, and telephone number. In this example, if the personal information does not exist even though the corresponding monthly sales chart is present, the output program can not output the name, etc., that corresponds to the monthly sales chart. When a plurality of data sets that depend on each other are to be replicated, it is sometimes desirable that the order of the replicating data that depend on each other is ensured, so that no contradiction occurs in the dependency even when a communication line is disconnected during the replicating. When the conventional FIFO order is used for replicating, the replicating order is ensured by the generation of the personal information and the data of the monthly sales chart in the named order. However, other data of which the transmission order need not be ensured are also replicated in the FIFO order, and an unnecessary transmission overhead may be assessed. When the batch processing is performed for replicating, the replicating order can not be obtained if the communication line is disconnected before the replicating has been completed. According to the present invention, Two Way Flush is designated for the generation of the final personal information, and then the monthly sales chart is prepared. As a result, the order in which the personal information and the monthly sales chart are replicated is ensured. The transmission overhead that assessed during this process can be reduced to the minimum possible.

We claim as our invention:

1. A computer for maintaining consistency of replica contents by interchanging data modification with another computer, said computer comprising:
    a replica including shared data;
    a receiver for receiving, from said another computer, a modification request for data included in said replica, wherein said modification request includes:
        a designation indicating no restriction for a modification order;
        a first designation indicating that after all modification requests preceding a current modification request have been affected by said replica, said replica is to be updated in accordance with said current modification request;
        a second designation indicating that modification requests following a current modification request are to be affected by said replica after said replica has been updated in accordance with said current modification request; or
        a third designation indicating that after all modification requests preceding a current modification request have been affected by said replica, said replica is to be updated in accordance with said current modification request, and that all modification requests following said current modification request are to be affected by said replica after said replica has been updated in accordance with said current modification request; and
    a controller for controlling, regardless of a receiving order of said modification request, for each receipt of said modification request, a timing of update execution for said replica in accordance with the received modification request by using information included in said modification request.

2. The computer according to claim 1, wherein said information included in said modification request further includes:
    a first number of modification requests that have been generated and that include said second or third designation; and
    a second number of modification requests that have been generated following the last modification request including said second or third designation.

3. The computer according to claim 2, wherein said controller stores first and second management values that respectively correspond to said first and second numbers and that define a timing of date execution for said replica.

4. The computer according to claim 2, wherein, if said replica is updated in accordance with said modification request, said controller stores, as third and fourth numbers, said first and second numbers included in said modification request.

5. The computer according to claim 4, further comprising a transmitter for transmitting to another computer a modification request for data in said replica, wherein said controller makes said third and fourth numbers to be included in said modification request.

6. A computer for maintaining consistency of replica contents by interchanging modification data with another computer, said computer comprising:
    a replica including shared data;
    means for instructing modification of data included in said replica, and for designating information concerning a modification order to the modification of data, wherein said information concerning said modification order includes:
        a designation indicating no restriction for a modification order;
        a first designation indicating that after all modification requests preceding a current modification request have been affected by said replica, said replica is to be updated in accordance with said current modification request;
        a second designation indicating that modification requests following a current modification request are to be affected by said replica after said replica has been updated in accordance with said current modification request; or
        a third designation indicating that after all modification requests preceding a current modification request have been affected by said replica, said replica is to be updated in accordance with said current modification request, and that all modification requests following said current modification request are to be affected by said replica after said replica has been updated in accordance with said current modification request;
    means for generating a modification request that corresponds to an instruction of the modification of data and includes information concerning said modification order; and a transmitter for transmitting said modification request in such a manner that it is not confirmed that a generation order and a transmitting order of said modification request are identical.

7. The computer according to claim 6, wherein said modification request further includes:
   a first number of modification requests that have been generated and that include said second or third designation; and
   a second number of modification requests that have been generated following the last modification request including said second or third designation.

8. The computer according to claim 6, further comprising a receiver for receiving from another computer a modification request for data included in said replica, wherein the received modification request includes response information indicating that said replica has been updated by a destination computer in accordance with the transmitted modification request.

9. The computer according to claim 8, further comprising means for referring to said response information to determine whether said modification request that has been transmitted is to be deleted.

10. The computer according to claim 6, further comprising a controller for controlling, regardless of a receiving order said modification request, for each receipt of said modification request, a timing of update execution for said replica in accordance with said received modification request.

11. A method for maintaining consistency replica contents between computers, said method comprising:
   a receiver in a first computer for receiving a modification request from a second computer for data included in a replica having shared data, wherein said modification request includes:
      a designation indicating no restriction for a modification order;
      a first designation indicating that after all modification requests preceding a current modification request have been affected by said replica, said replica is to be updated in accordance with said current modification request;
      a second designation indicating that modification requests following a current modification request are to be affected by said replica after said replica has been updated in accordance with said current modification request; or
      a third designation indicating that after all modification requests preceding a current modification request have been affected by said replica, said replica is to be updated in accordance with said current modification request, and that all modification requests following said current modification request are to be affected by said replica after said replica has been updated in accordance with said current modification request; and
   controlling regardless of a receiving order of said modification request, for each receipt of said modification request, a timing of update execution for said replica in accordance with the received modification request by using information included in said modification request.

12. The method according to claim 11, wherein said information included in said modification request further includes:
   a first number of modification requests that have been generated and that include said second or third designation; and
   a second number of modification requests that have been generated following the last modification request including said second or third designation.

13. The method according to claim 12, further comprising storing first and second management values that respectively correspond to said first and second numbers and that define a timing of update execution for said replica.

14. The method according to claim 12, wherein, if said replica is updated in accordance with said modification request, storing said first and second numbers included in said modification request as third and fourth numbers.

15. The method according to claim 14, further comprising transmitting to another computer a modification request for data in said replica, wherein said controller makes said third and fourth numbers to be included in said modification request.

* * * * *